(12) United States Patent
Ho et al.

(10) Patent No.: US 11,500,878 B2
(45) Date of Patent: Nov. 15, 2022

(54) MECHANISM TO SYNCHRONIZE, CONTROL, AND MERGE DATA STREAMS OF DISPARATE FLOW CHARACTERISTICS

(71) Applicant: salesforce.com, inc., San Francisco, CA (US)

(72) Inventors: Shan-Cheng Ho, Sunnyvale, CA (US); Percy Mehta, Foster City, CA (US); Yogesh Patel, Dublin, CA (US); Lucas Ung, San Francisco, CA (US); Birva Joshi, Sunnyvale, CA (US); Wing Hing Ku, San Jose, CA (US); Mattia Padovani, San Francisco, CA (US)

(73) Assignee: salesforce.com, inc., San Francisco, CA (US)

(*) Notice: Subject to any disclaimer, the term of this patent is extended or adjusted under 35 U.S.C. 154(b) by 89 days.

(21) Appl. No.: 16/779,398

(22) Filed: Jan. 31, 2020

(65) Prior Publication Data
US 2021/0240714 A1    Aug. 5, 2021

(51) Int. Cl.
*G06F 16/00* (2019.01)
*G06F 16/2455* (2019.01)
*G06F 16/27* (2019.01)

(52) U.S. Cl.
CPC ........ *G06F 16/24568* (2019.01); *G06F 16/27* (2019.01)

(58) Field of Classification Search
CPC .................. G06F 16/27; G06F 16/24568
See application file for complete search history.

(56) References Cited

U.S. PATENT DOCUMENTS

| | | |
|---|---|---|
| 7,730,478 B2 | 6/2010 | Weissman |
| 10,250,662 B1* | 4/2019 | O'Connell .......... H04L 65/4069 |
| 10,455,264 B2 | 10/2019 | Patel et al. |
| 10,681,499 B2 | 6/2020 | Padovani et al. |
| 10,762,109 B2 | 9/2020 | Rushan et al. |
| 10,878,218 B2 | 12/2020 | Whelan et al. |
| 10,904,303 B2 | 1/2021 | Patel et al. |
| 2013/0054648 A1 | 2/2013 | Mehta et al. |
| 2015/0256464 A1* | 9/2015 | Lewin-Eytan ........ H04L 47/822 370/235 |
| 2018/0131613 A1* | 5/2018 | Fraser ..................... H04L 47/12 |
| 2019/0037003 A1* | 1/2019 | Bowen ................ H04L 65/4076 |
| 2019/0132387 A1* | 5/2019 | Singh .................. H04L 67/1095 |
| 2019/0140995 A1 | 5/2019 | Roller et al. |
| 2019/0163791 A1 | 5/2019 | Sanathkumar et al. |
| 2019/0179673 A1 | 6/2019 | Gray et al. |
| 2019/0179931 A1 | 6/2019 | Gupta et al. |
| 2019/0213552 A1 | 7/2019 | Gupta et al. |
| 2019/0238604 A1 | 8/2019 | Sundaram et al. |

(Continued)

*Primary Examiner* — Khanh B Pham
(74) *Attorney, Agent, or Firm* — Nicholson, De Vos, Webster & Elliott, LLP

(57) ABSTRACT

A method and system manage synchronization of data streams in a multi-tenant system. The method includes tracking by a flow control mechanism a recent flow rate of at least one data stream, determining by the flow control mechanism whether the flow rate of the at least one data stream varies from at least one related data stream, and adjusting by the flow control mechanism a throughput of the at least one data stream to correlate with the at least one related data stream, in response to determining that the at least one data stream has varied from the at least one related data stream.

18 Claims, 8 Drawing Sheets

(56) References Cited

U.S. PATENT DOCUMENTS

| | | |
|---|---|---|
| 2019/0238605 A1 | 8/2019 | Patel et al. |
| 2019/0258558 A1* | 8/2019 | Beuch ................. G06F 11/3065 |
| 2019/0370080 A1 | 12/2019 | Patel et al. |
| 2020/0134081 A1 | 4/2020 | Ho |
| 2020/0186853 A1* | 6/2020 | Vastardis ............ H04L 65/4084 |
| 2020/0311637 A1 | 10/2020 | Benani et al. |
| 2021/0034574 A1 | 2/2021 | Choudhari et al. |
| 2021/0034627 A1 | 2/2021 | Mehta et al. |
| 2021/0037073 A1 | 2/2021 | Sundaram et al. |
| 2021/0149720 A1 | 5/2021 | Mehta et al. |

\* cited by examiner

MECHANISM TO SYNCHRONIZE, CONTROL, AND MERGE DATA STREAMS OF DISPARATE FLOW CHARACTERISTICS

TECHNICAL FIELD

One or more implementations relate to the field of data management; and more specifically, to a process and system for data stream management to manage the relative throughput of data streams.

BACKGROUND ART

Web applications that serve and manage millions of Internet users, such as Facebook™, Instagram™, Twitter™, banking websites, as well as online retail shops, such as Amazon.com™ or eBay™ are faced with the challenge of ingesting high volumes of data as fast as possible so that the end users can be provided with a real-time experience. The "Internet of Things" (IoT) is another major contributor to big data, supplying huge volumes of data. IoT has become a pervasive presence in the environment, with a variety of things/objects that communicate via wireless and wired connections to interact with each other and cooperate with other things/objects to create new applications/services. These applications/services exist in smart cities (regions), smart cars and mobility, smart homes and assisted living, smart industries, public safety, energy and environmental protection, agriculture and tourism. A massive quantity of data gets persisted from the millions of IoT devices and web applications.

Event management systems can be utilized to manage data distribution in these types of systems. In current event management systems, a high volume of events is published by multiple event producers and then delivered to multiple consumers. The event management system is a large scale, asynchronous, distributed system where failures are inevitable due to network failures, equipment failures and similar issues. Events are organized into different streams. Publishing events as part of event streams is asynchronous.

The engagement of users that interact with software such as webpages, email programs, word processing, and similar applications and interfaces is also an important type of activity that is tracked to determine metrics that assist developers and administrators in improving and administering the software and interfaces. These engagements can be monitored by activity tracking software and collected as a set of events. This activity tracking also generates a large amount of traffic in the form of data streams that report the various types of tracked activities. In complex multi-tenant and cloud computing environments collecting and corelating the events and then generating useful metrics is resource intensive. In particular, where real-time tracking of metrics is desired even minor inefficiencies can cause significant issues and use of resources.

These and other contexts are contexts where a large number of data streams with varying levels of relationships between the data streams are handled. The data streams feed a continuous flow of data into downstream processes and applications. Data from different sources and of different types generally are output as separate data streams. In some cases, data from a source is divided into 'sub-streams' to accommodate system requirements or characteristics such as geographic distribution, tenant privacy protection, or processing rate optimization. The variety and differences between streams and sub-streams can complicate the downstream processing of the data in these streams.

BRIEF DESCRIPTION OF THE DRAWINGS

The following figures use like reference numbers to refer to like elements. Although the following figures depict various exemplary implementations, alternative implementations are within the spirit and scope of the appended claims. In the drawings:

DETAILED DESCRIPTION

The following description describes methods and apparatus for data stream management that is scalable and does not require large cache or data storage to enable data stream merger and synchronization. The implementations utilize message topic and processing unit to observe and control varying progress of data streams to synchronize or merge the data streams. The implementations provide a flow control mechanism that monitors the throughput of each stream and/or sub-stream and correlates and controls the throughput of data stream in coordination with other related data stream or sub-stream.

Figure 1:
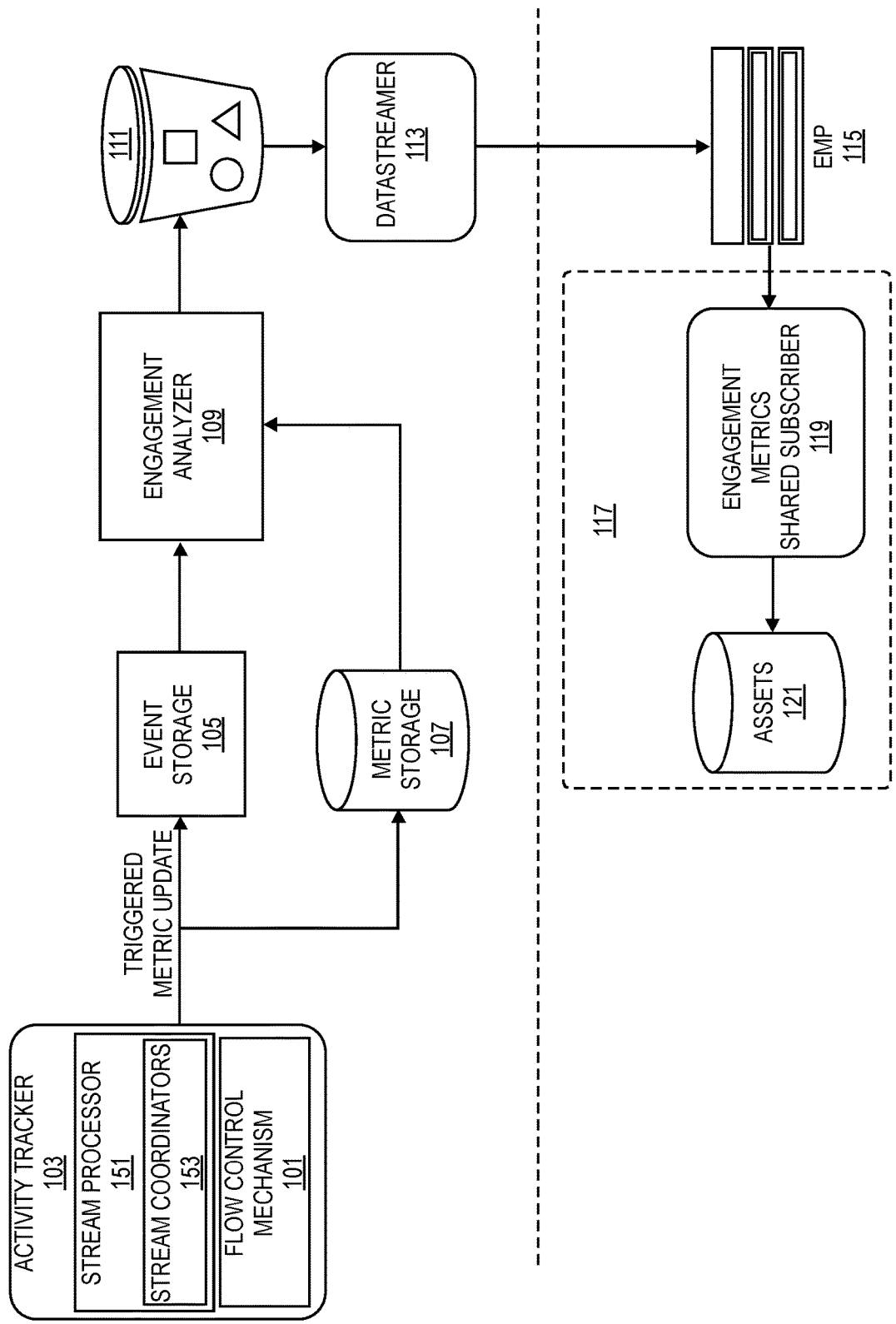
FIG. 1 is a block diagram illustrating an activity tracking architecture according to some example implementations.

FIG. 1 is a block diagram illustrating an activity tracking architecture according to some example implementations. An example architecture for implementing a flow control mechanism 101 is shown that applies the flow control mechanism 101 to manage data streams in an engagement and event tracking platform. The example architecture is provided by way of illustration and not limitation. One skilled in the art would appreciate that the example implementation can be applied to other contexts and architectures consistent with the principles and features described herein.

The example architecture includes an activity tracker 103, event storage 105, metric storage 107, engagement analyzer 109, data organizer 111, a data streamer 113, an enterprise messaging platform (EMP) 115, and tenant services 117 including engagement metrics subscription 119 and assets 121.

The components illustrated can be implemented in a multi-tenant cloud computing environment. Thus, each component can be implemented via distributed computing processes and resources. For sake of clarity and conciseness, the components are discussed as distinct software components implemented in a general multi-tenant cloud computing environment. However, one skilled in the art would understand that any number of instances of these components or distributed versions of these components can be executed in cluster nodes or similar units of execution in a cloud computing environment where the cluster nodes are managed by cluster management software or similar cloud computing environment management software. Similarly, these components can operate on or execute in virtualized software environments in combination with cloud computing environments, where instances of components execute within in any number of virtual machines or in similar virtual execution environment structures.

The activity tracker 103 can be any software capable of monitoring, and/or receiving and generating activity (also referred to as engagement) data relating to user interactions and similar software events. Any number of data streams of any number of events that report activity can be generated by the activity tracker 103. The activity tracker 103 or the event publishing portions thereof can be implemented utilizing a distributed stream processing computation framework such as Apache Storm (managed by the Apache Software Foundation). In an example implementation, the activity tracker 103 can monitor and publish collected data related to email usage. A salesperson can send out an email to more than one million recipients that includes a sales promotion. When the recipients of the email interact with the email via actions like opening, viewing, replying, clicking on a link in the email, or similar actions, each of these activities can generate an activity or event that is output from the activity tracker 103 via a message queue. The organization where the salesperson who sent the email works would like to have real time information about these activities to determine the efficacy of the sales promotion sent via the email. Other example scenarios for implementation can include a call center where multiple marketers are working on leads for sales and the call center manager wants to monitor real time statistics related to interactions of the marketers with potential customers such as numbers dialed, number of voicemails left, live call conversations, call backs, and similar data.

The output from the activity tracker 103 is a set of data streams of messages with event information. These data streams are received by an event storage 105 and a metric storage 107. The event storage 105, such as Apache Kafka (managed by the Apache Software Foundation) or similar event management or storage solution, receives the data streams and records the events from the messages in the data streams. The events can be stored in any format or schema and can be stored in any type of storage system or database management system.

In parallel, the data streams are received by a metric storage 107. Alternatively, the metric storage or intermediate components can retrieve the events from the event storage 105. The metric storage 107 is an event or data storage system (e.g., Apache Cassandra (managed by the Apache Software Foundation)). The metric storage 107 stores metrics and related data relevant to generating metrics for the data streams output by the activity tracker 103.

As the volume of data grows from engagement monitoring and similar activity tracking, it becomes more computationally and resource intensive to process in a real-time streaming manner. The message queue that is output by the activity tracker 103 includes data from multiple organizations (i.e., tenants) in a multi-tenant environment. The types of activities monitored (i.e., assets), and the consumers of the real-time metrics (i.e., a target audience) all are part of the process for proper collection, organization, and delivery of the relevant metrics and related data. Many metrics are determined by or retrieved using queries to the metric storage 107, for example by the engagement analyzer 109. However, broad-based queries over large data sets is slow regardless of the dedicated resources. The implementations improve the processing speed of the data being sent to the event storage 105 and the metric storage 107.

Figure 2:
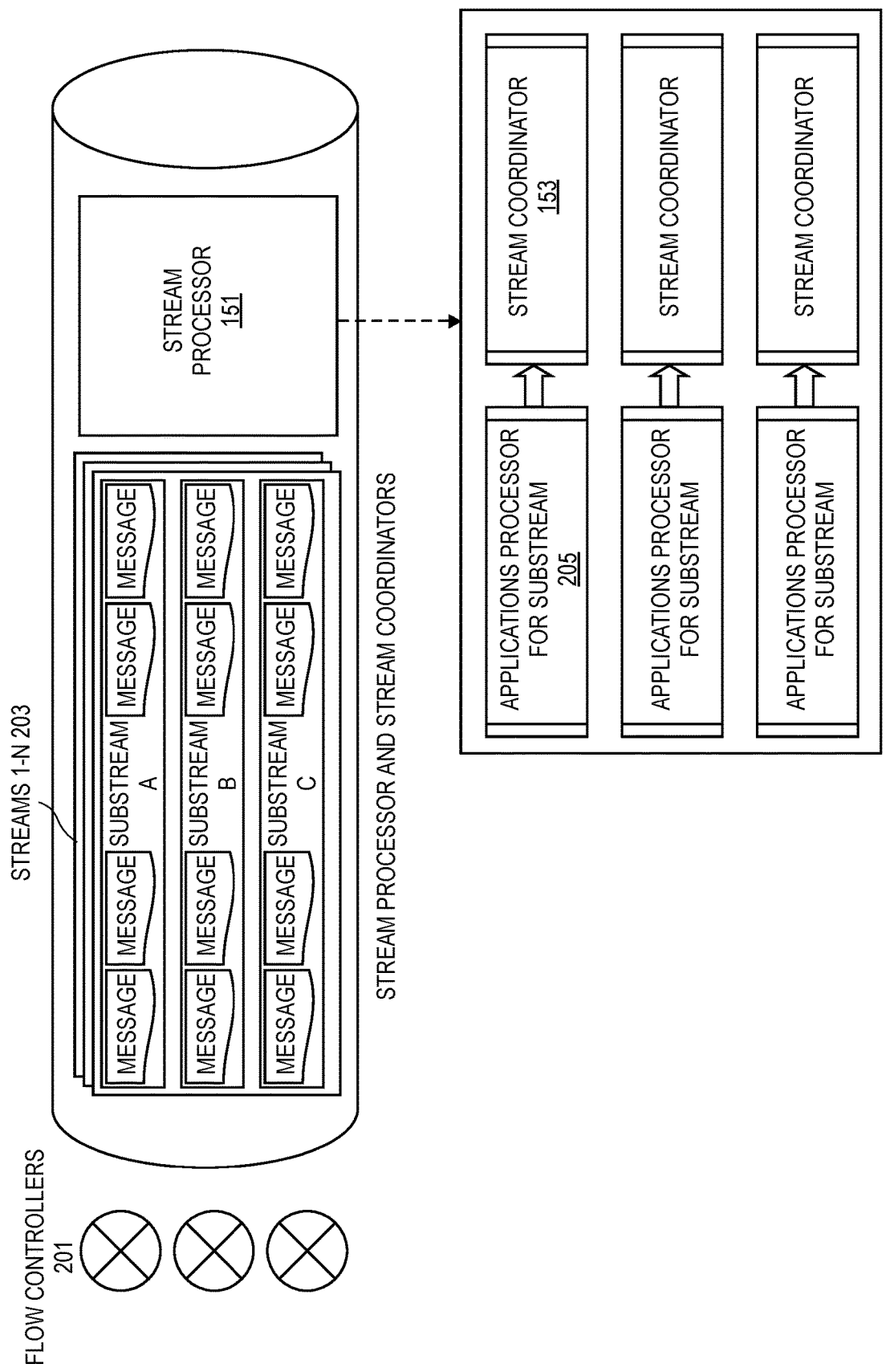
FIG. 2 is a block diagram of a set of streams and sub-streams processed by a stream processor according to some example implementations.
Figure 3:
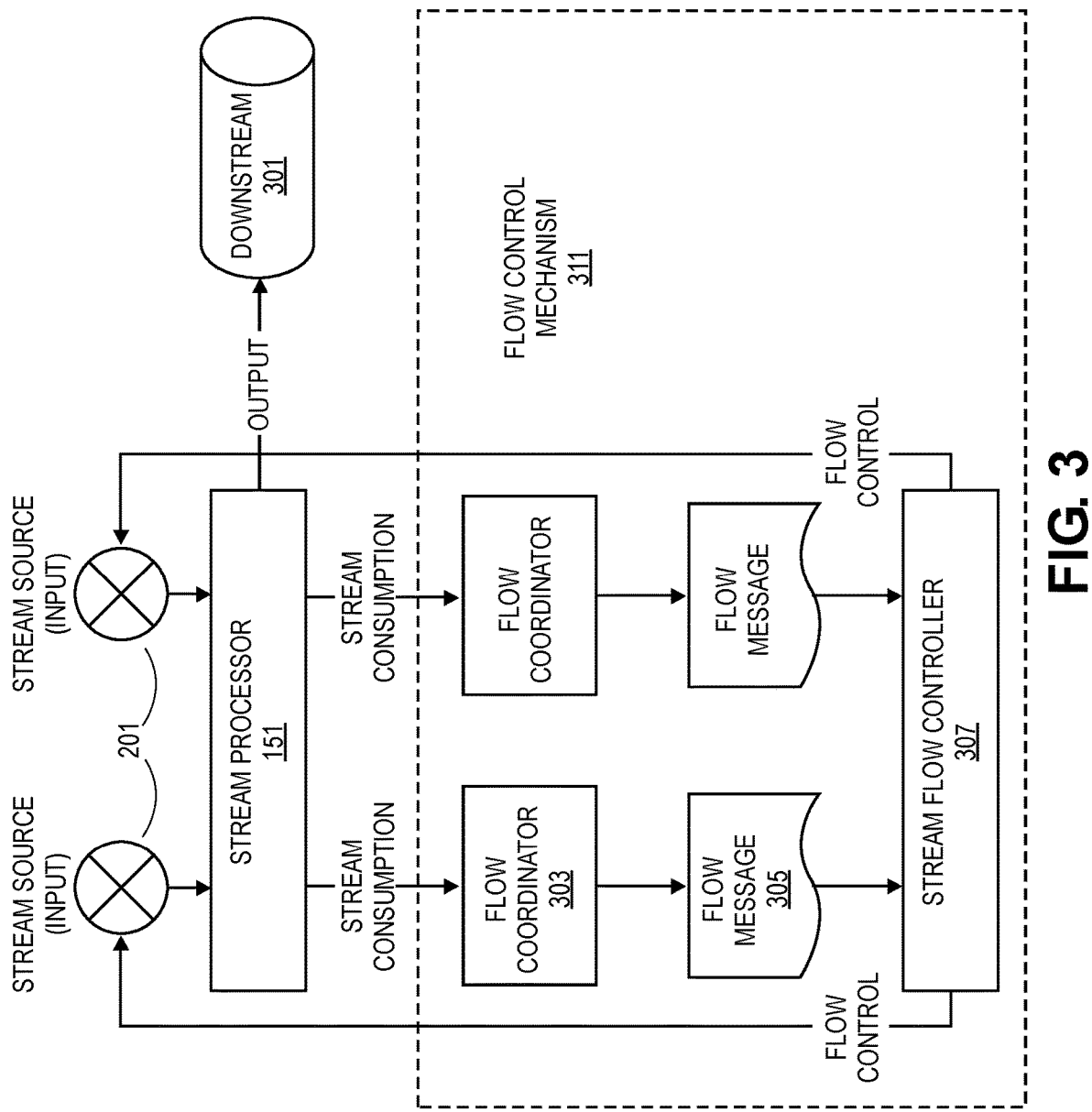
FIG. 3 is a block diagram of a mechanism for data stream control according to some example implementations.
Figure 4:
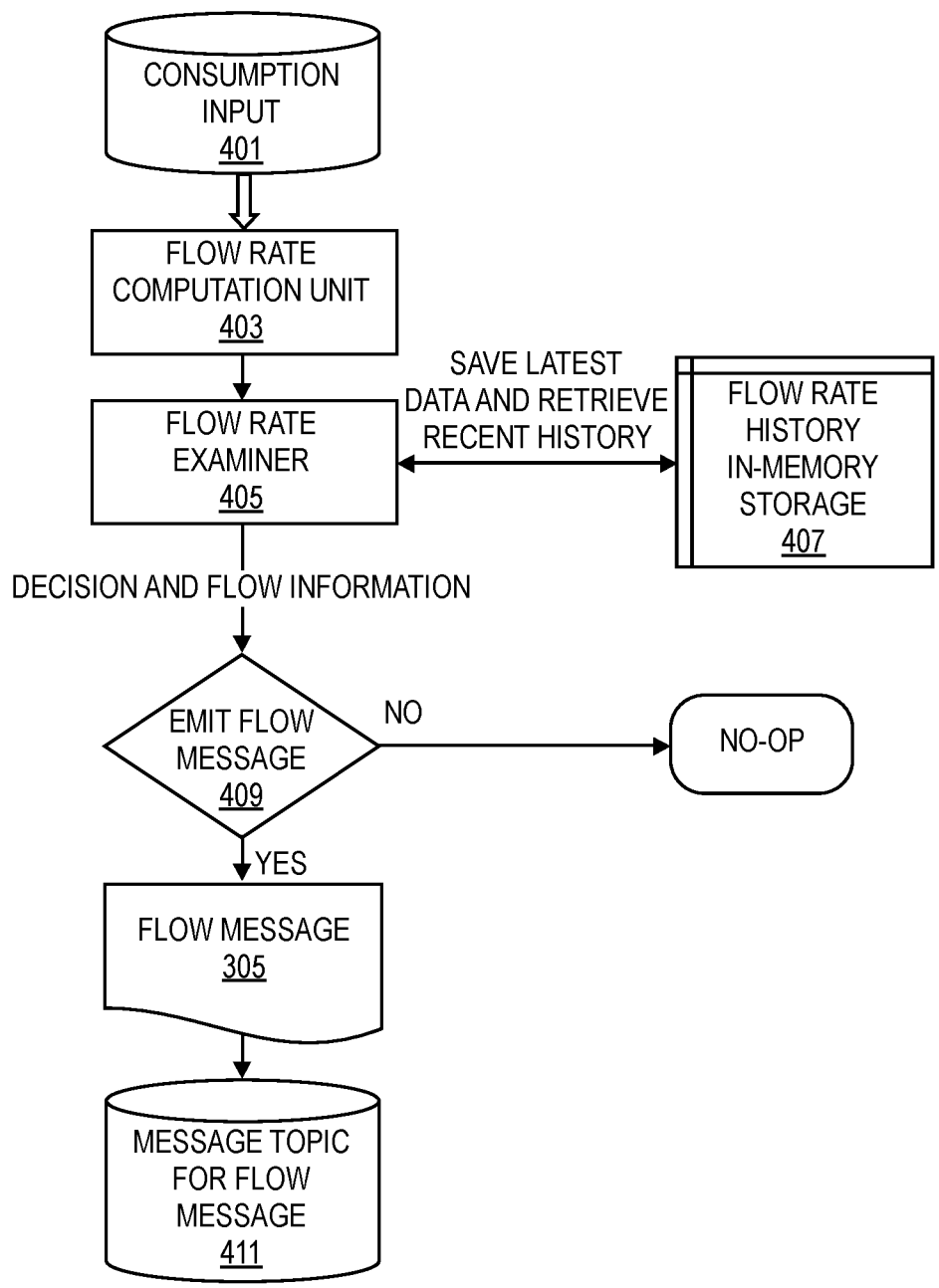
FIG. 4 is a block diagram of a flow coordinator according to some example implementations.

In one implementation, the activity tracker 103 or similar data source includes a set of stream processors 151 and stream coordinators 153 to manage the processing of streams that are processing data from any number of input sources and managing the output of these data streams to any number of downstream components. A set of flow control mechanisms 101 can provide control, merger, and synchronization for the data streams. The components of one example implementation of the flow control mechanism 101 are shown in FIGS. 2-4. The overall operation of the flow control mechanism 101 is discussed further herein below with relation to FIG. 6. A 'set,' as used herein, refers to any positive whole number of items including one item.

In many instances, the components of an architecture such that illustrated in FIG. 1 need to process multiple data streams of different types of data to better understand the utility or values of the data in each data stream. For example, a data stream of a web page visit log could be merged with a user's preference data to generate new recommendations specific to a user. In another example, a data stream of sales prospect engagement history could be synchronized with update requests in another data stream generated by other applications. Being able to synchronize or merge different streams gives applications or other components in a system the capability to respond to user or business needs in near real-time fashion. However, to synchronize or merge streams there are significant challenges.

A simple data stream merge mechanism would assume that the data streams being merged have similar flow characteristics (e.g., similar flow rates). A basic merge of two data streams would requires that both data streams have similar behaviors in terms of latency. If the data in the two data streams arrive with a very small latency, such as a few hundred milliseconds, a processing unit performing the merge can cache the data that arrives earlier in memory or external storage available to the processing unit. However, caching data in this manner has significant limitations. Data streams that have a high difference in latency behavior or pulse like data streams cannot be cached in the same manner because the amount of data that would need to be cached would overwhelm memory or storage. Any use of an external storage adds significant latency for reads and writes making use of larger external storage impractical.

The flow control mechanism 101 enables the generation of control messages on a commonly shared control channel for peer streams to observe the overall stream flow status and to decide whether to throttle or withhold flow to synchronize processing of a given data stream with peer data streams. This commonly shared control channel is utilized by stream coordinators 153 and stream processors 151 as well and data stream input sources to implement the synchronization. The operation of these structures and the overall process is described in greater detail with reference to FIGS. 2-6 below.

The engagement analyzer 109 can read from the metric storage 107 to collect metric information and marshal the information for further consumption downstream. The engagement analyzer 109 can also write back relevant information and generate events to be stored in the event storage 105 or to be passed downstream. In one implementation, the engagement analyzer 109 can be implemented as an engagement writeback topology via Apache Spark (managed by the Apache Software Foundation) or similar cluster computing framework. The engagement analyzer 109 can stream data via a data organizer 111 and data streamer 113 to an enterprise messaging platform 115 to be consumed by a target user via tenant services 117.

A data streamer 113 manages the forwarding of data between platforms. In this example implementation data is being forwarded from an engagement platform to a tenant services platform. However, the downstream consumption is provided by way of example and not limitations. The implementations are applicable to any type of downstream consumption architecture. In this example implementation, the enterprise messaging platform 115 receives the streams of data from the data streamer 113 where a target audience (e.g., a user of a tenant service 117) has subscribed to receive the real-time metrics via an engagement metrics subscription 119 that stores the information in a tenant assets database or similar tenant storage for consumption by the target audience via any metric viewing application or interface provided in the tenant services 117.

FIG. 2 is a block diagram of a set of streams and sub-streams processed by a stream processor according to some example implementations. The illustration shows a segment of a set of data streams in an overall streaming architecture. In each segment a set of flow controller 201 manage the throughput of incoming data stream messages that are sent from upstream data sources from the sources or a prior segment. A stream processor 151 processes a stream or set of streams 203. Any number of stream processors 151 can process the set of streams 203 in a given segment. Each stream 203 can be composed of a set of sub-streams (e.g., sub-streams A-C). Within a stream processor 151 a set of application processes and stream coordinators process each sub-stream where each sub-stream is assigned a different application processor 205 and stream coordinator 153. Each stream can have a different identifier or stream ID and each sub-stream can similarly have a separate sub-stream ID. The streams are composed of messages or more specifically stream data messages that are the data record units of the stream. Each message can include a message timestamp that is assigned with the message is created and enqueued to the data stream.

The stream processors 151 can be arranged in a sequential manner in a stream to process the messages of the stream. In some implementations, stream processors that are further upstream may have a lower numbered identifier, while stream processors that are downstream may have a higher numbered identifier. The stream processor 151 distributes work to application processors 205 and stream coordinators 153 according to sub-streams. These components can timestamp a message upon receipt or creation and work to publish the message, which means to forward the message to each subscriber of a data stream and/or forwarding the message to the next downstream component configured for the data stream.

FIG. 3 is a block diagram of a mechanism for data stream control according to some example implementations. The data streams each originate from a source and are sent downstream to be processed by a stream processor 151. In some implementations, sub-streams can be separately sent or separated out by the stream processor to separate stream coordinators (not shown). For sake of clarity and conciseness, the implementations are primarily described with relation to stream processes. However, one skilled in the art would understand that the principles, processes, and structures described herein are also applicable to the processing of sub-streams in addition to data streams.

The source of each data stream can be managed via flow controllers 201, which can be any mechanism that can slow the flow or throughput of a data stream. The flow controller 201 can be implemented as part of an application that is generating messages and data for a data stream, an upstream stream processor or similar mechanism. The data streams are received by a stream processor 151 or set of stream processors. The stream processor 151 can distribute sub-streams to separate stream coordinators to process and output the sub-stream to downstream components 301 such as event storage, metric storage, engagement analysis, data streamer or similar downstream components. Absent the flow control mechanism 311, each message in each stream and each sub-stream is processed as quickly as possible and sent downstream 301. However, this can cause streams with related data or sub-streams of a given stream to have significantly different flow rates due to difference in the processing of different types of messages and data in different streams and sub-streams. This can be undesirable for some downstream components that process related data across streams or sub-streams.

Each message in each data stream or sub-stream is processed in the stream processor and a timestamp is computed for each as they are ready for publishing (i.e., sending downstream). The stream processor or stream coordinator can determine which message to publish next by examining the timestamps of the available messages and depending on the publishing policy select a message to publish. A most recent or oldest timestamp can be selected for a message across all sub-streams or streams depending on the configuration of the stream processor 151 and the stream coordinators. In the example implementations, if a stream or sub-stream begins to lag behind other relates sub-streams or streams (as defined by configuration information, stream or sub-stream metadata or similar information), then the stream processor 151 or stream coordinator can publish more messages from the lagging stream or sub-stream to improve it's flow rate. A flow message 305 can also be generated to be published to a control channel that is subscribed to by flow controllers and a stream flow controller 201 in the flow control mechanism 311 to enable faster streams or sub-streams to be throttled. The flow message 305 can include a stream or sub-stream ID and any advisory information such as flow rate information. A flow message 305 can further include timestamp of the last processed message in the stream or sub-stream, an advisory string for peer status, a timestamp for a bearer flow message, or similar.

A flow control mechanism 311 can monitor stream processing or consumption information to determine whether streams or sub-streams with related information should have their flow rates adjusted. Each data stream or sub-stream has a full data stream rate that would be a default flow rate for the data stream or sub-stream. This full flow rate would be based on the characteristics of the data in the data stream and data sub-streams and how quickly it can be generated and processed. The flow rate of a data stream or sub-stream can be throttled by a flow controller 201 to control the flow rate relative to the full flow rate. A data stream or sub-stream can be decreased below the full flow rate all the way to zero and can be increased from zero up to the full flow rate. The flow control mechanism 311 makes a determination as to the flow rate of each monitored data stream and sub-stream.

The flow control mechanism 311 can include a flow coordinator 303 that determines the current flow rate and related conditions for each stream or sub-stream. The flow coordinator 303 can output flow messages 305 that inform the stream flow controller 307 of the current conditions of an associated stream or sub-stream. The stream flow controller 307 can receive flow messages 305 for each stream and/or sub-stream from a set of flow coordinators. In some implementations, a separate flow coordinator 303 handles each stream or sub-stream.

The stream flow controller 307 receives all flow messages and tracks the relative speed and progress of each stream, sub-stream or a sub-set thereof where multiple stream flow controllers are configured to manage any number of streams and/or sub-streams. If a managed data stream or sub-stream is running ahead of other related streams or sub-streams, then the stream flow controller 307 can reduce the flow rate of that data stream or sub-stream. This can be a temporary flow rate reduction until other related data streams or sub-streams catch up. The stream flow controller can increase a flow rate of a managed data stream where it is throttled, and related streams and/or data streams have caught up or exceeded the progress of the managed data stream. A stream flow controller 307 can affect the throttling via flow control commands or messages to flow controller 201.

In some cases, a stream flow control 307 receives an advisory or similar alert in the flow messages on the common control channel. Such an advisory or alert can be considered a notification of abnormal stream or sub-stream status. The related stream or sub-streams can be halted until the alert is resolved. The operation of the flow coordinators 303 is described further in relation to FIG. 4 and the operation of the stream flow controller 307 is described further in relation to FIG. 5.

FIG. 4 is a block diagram of a flow coordinator according to some example implementations. Each flow coordinator receives consumption input 401 from a stream processor and/or stream coordinator. The consumption input 401 includes information about the consumption of messages for a given data stream or sub-stream. This consumption input 401 can include stream ID and/or sub-stream ID, timestamp information, and similar information to enable the computation of a current flowrate of a stream or sub-stream.

The flow rate computation unit 403 processes the received consumption input 401 and determines a current flow rate for the stream or sub-stream. The flow rate can be computed by comparing the timestamps of messages being published or processed to timestamps of the same messages when received or sent from the source or prior stream processor. The current flow rate of the stream or sub-stream is then fed to the flow rate examiner 405. The flow rate examiner 405 can store the current flow rate in a flow rate history 407. The flow rate examiner 405 maintains a recent history of reported flow rates in the flow rate history 407 that can be stored in a local memory or cache. The flow rate examiner 405 compares the current flow rate with the recent history to identify whether the current flow rate has significantly deviated from the recent flow rates in the history. If a significant deviation is detected or not detected, then a decision to emit a flow message is made (Block 409). If no significant deviation is detected, then no action is taken (e.g., a no-op (no operation) is taken). However, if a significant deviation is detected, where a significant deviation can be determined based on any threshold or configuration, then a flow message 305 is published to the common control channel 411 (e.g., as a message for a specific topic) to enable the stream flow controllers to examine the deviation and make adjustments to flows of related streams or sub-streams.

Figure 5:
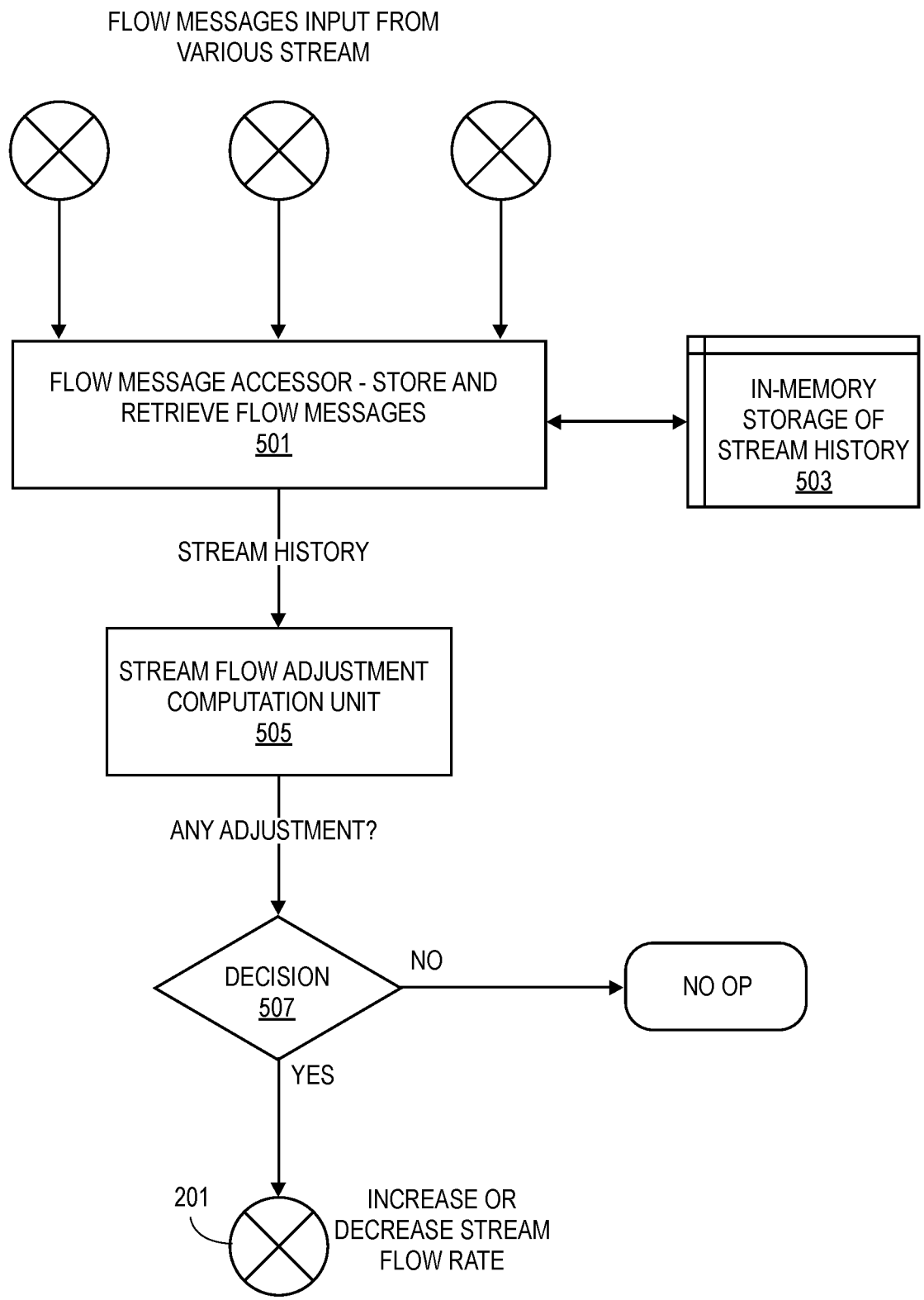
FIG. 5 is a block diagram of a stream flow controller according to some example implementations.

FIG. 5 is a block diagram of a stream flow controller according to some example implementations. The stream flow controller receives flow messages via a common control channel from any number of flow coordinators or similar sources. A flow message accessor 501 retrieves or accepts these flow messages and stores them in a stream history 503. The stream history 503 can be in a local memory and store any number of recent flow messages. A stream flow adjustment computation unit 505 examines the stream history 503 to determine whether any data stream or sub-stream should have its flow rate adjusted. The stream flow adjustment computation unit 505 can also utilize configuration information or metadata within the stream history or separately available to determine which streams or sub-streams are inter-dependent or related. The stream flow adjustment computation unit 505 can identify related streams or sub-streams that are lagging behind the related streams and determine to slow or halt the other streams or sub-streams. Similarly, a stream or sub-stream that is pacing ahead of related streams or sub-streams that have been throttled to less than full flow rate can have their flow rate increased. The stream flow adjustment computation unit attempts to synchronize related data streams and sub-streams by managing flow rates to match a slowest related stream or sub-stream thereby keeping the set of related streams or sub-streams synchronized. This enables the related streams and sub-streams to be easily merged or otherwise processed as a group downstream. The correlation of the streams and sub-streams can be configured via any administrative configuration or by users via metadata or control information within the data stream or in the common control channel.

The stream flow adjustment computation unit 505 decides to adjust a flow rate of any data stream or stream based on the comparison of the data in the stream history on a continuous basis (Block 507). If the stream history indicates that the related streams or sub-streams are within prescribed bounds (i.e., relatively in synchronization), then the decision does not change the flow rate of any data stream. If the stream history indicates that at least one related stream or sub-stream is to have an adjusted flow rate, then the decision is to send a flow control message to a flow controller 201 for the respective data stream or sub-stream to increase or decrease the flow rate to match or approximate the related data streams or sub-streams where data streams and sub-streams that are related will all be adjusted to match a slowest related stream or sub-stream that is operating at its full flow rate.

Figure 6:
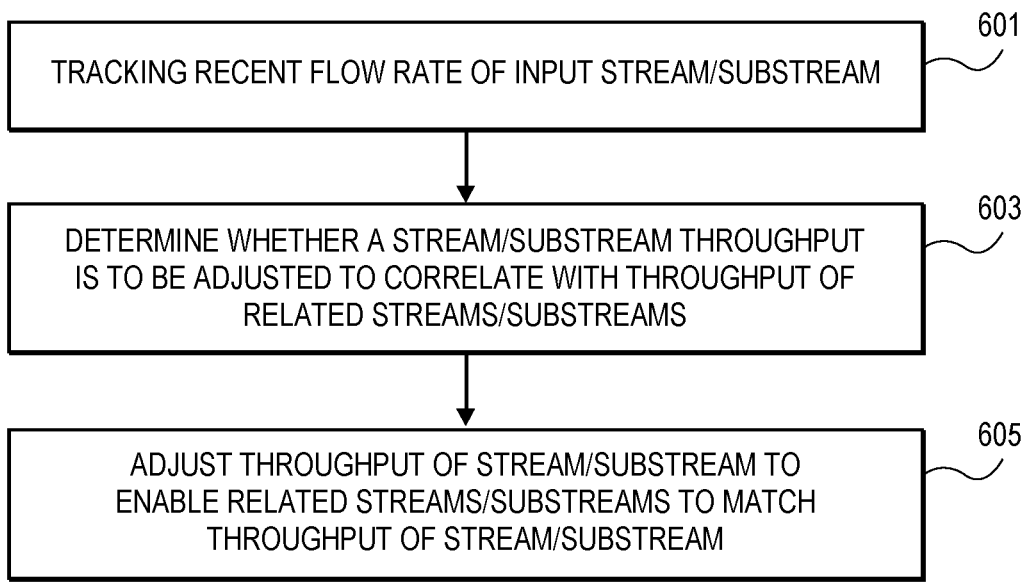
FIG. 6 is a flow diagram of the flow control process according to some example implementations.

FIG. 6 is a flow diagram of the flow control process according to some example implementations. The flow control process is implemented by a flow control mechanism including any combination of a stream flow controller, flow coordinators, and flow controllers. The operation of the flow control process monitors a recent flow rate of each input data stream or sub-stream (Block 601). The recent flow rate for each flow can be maintained in recent flow rate histories in memory. In some implementations, alerts or reports related to the status of specific data streams or sub-streams is correlated and compared to identify whether the throughput or flow rate of any stream or sub-stream is to be adjusted to correlate with the throughput of other related streams or sub-streams (Block 603). Where a stream or sub-stream is identified to be adjusted, the flow control mechanism issues flow control messages or signals to adjust the throughput of one or more streams or sub-stream to enable the related streams and/or sub-streams to match a throughput of a given stream or sub-stream (Block 605).

The term "user" is a generic term referring to an entity (e.g., an individual person) using a system and/or service. A multi-tenant architecture provides each tenant with a dedicated share of a software instance and the ability (typically) to input tenant specific data for user management, tenant-specific functionality, configuration, customizations, nonfunctional properties, associated applications, etc. Multi-tenancy contrasts with multi-instance architectures, where separate software instances operate on behalf of different tenants. A tenant includes a group of users who share a common access with specific privileges to a software instance providing a service. A tenant may be an organization (e.g., a company, department within a company, etc.). A tenant may have one or more roles relative to a system and/or service. For example, in the context of a customer relationship management (CRM) system or service, a tenant may be a vendor using the CRM system or service to manage information the tenant has regarding one or more customers of the vendor. As another example, in the context of Data as a Service (DAAS), one set of tenants may be vendors providing data and another set of tenants may be customers of different ones or all of the vendors' data. As another example, in the context of Platform as a Service (PAAS), one set of tenants may be third party application developers providing applications/services and another set of tenants may be customers of different ones or all of the third-party application developers. A user may have one or more roles relative to a system and/or service. To provide some examples, a user may be a representative (sometimes referred to as an "end user") of a tenant (e.g., a vendor or customer), a representative (e.g., an administrator) of the company providing the system and/or service, and/or a representative (e.g., a programmer) of a third-party application developer that is creating and maintaining an application(s) on a Platform as a Service (PAAS).

Exemplary Electronic Devices

Electronic Device and Machine-Readable Media

One or more parts of the above implementations may include software and/or a combination of software and hardware. An electronic device (also referred to as a computing device, computer, etc.) includes hardware and software, such as a set of one or more processors coupled to one or more machine-readable storage media (e.g., magnetic disks, optical disks, read only memory (ROM), Flash memory, phase change memory, solid state drives (SSDs)) to store code (which is composed of software instructions and which is sometimes referred to as computer program code or a computer program) for execution on the set of processors and/or to store data. For instance, an electronic device may include non-volatile memory (with slower read/write times, e.g., magnetic disks, optical disks, read only memory (ROM), Flash memory, phase change memory, SSDs) and volatile memory (e.g., dynamic random access memory (DRAM), static random access memory (SRAM)), where the non-volatile memory persists code/data even when the electronic device is turned off or when power is otherwise removed, and the electronic device copies that part of the code that is to be executed by the set of processors of that electronic device from the non-volatile memory into the volatile memory of that electronic device during operation because volatile memory typically has faster read/write times. As another example, an electronic device may include a non-volatile memory (e.g., phase change memory) that persists code/data when the electronic device is turned off, and that has sufficiently fast read/write times such that, rather than copying the part of the code/data to be executed into volatile memory, the code/data may be provided directly to the set of processors (e.g., loaded into a cache of the set of processors); in other words, this non-volatile memory operates as both long term storage and main memory, and thus the electronic device may have no or only a small amount of volatile memory for main memory. In addition to storing code and/or data on machine-readable storage media, typical electronic devices can transmit code and/or data over one or more machine-readable transmission media (also called a carrier) (e.g., electrical, optical, radio, acoustical or other form of propagated signals—such as carrier waves, infrared signals). For instance, typical electronic devices also include a set of one or more physical network interface(s) to establish network connections (to transmit and/or receive code and/or data using propagating signals) with other electronic devices. Thus, an electronic device may store and transmit (internally and/or with other electronic devices over a network) code and/or data with one or more machine-readable media (also referred to as computer-readable media).

Electronic devices are used for a variety of purposes. For example, an electronic device (sometimes referred to as a server electronic device) may execute code that cause it to operate as one or more servers used to provide a service to another electronic device(s) (sometimes referred to as a client electronic device, a client computing device, or a client device) that executes client software (sometimes referred to as client code or an end user client) to communicate with the service. The server and client electronic devices may be operated by users respectively in the roles of administrator (also known as an administrative user) and end user.

Figure 7A:
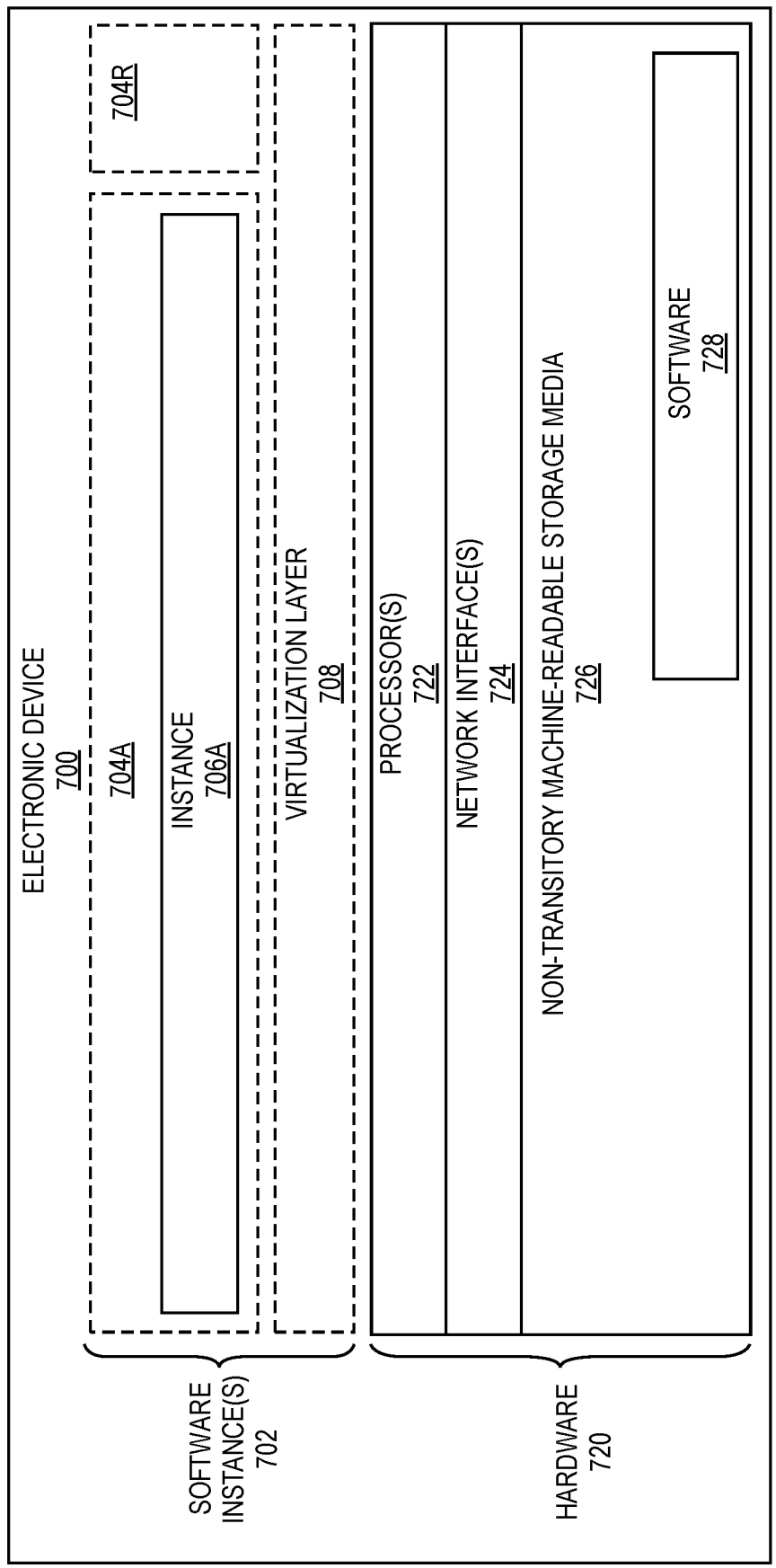
FIG. 7A is a block diagram illustrating an electronic device according to some example implementations.

FIG. 7A is a block diagram illustrating an electronic device 700 according to some example implementations. FIG. 7A includes hardware 720 comprising a set of one or more processor(s) 722, a set of one or more network interfaces 724 (wireless and/or wired), and non-transitory machine-readable storage media 726 having stored therein software 728 (which includes instructions executable by the set of one or more processor(s) 722). Each of the previously described components of the example architecture and the flow control mechanism may be implemented in one or more electronic devices 700. In one implementation: 1) each of the architectural components is implemented in a separate one of the electronic devices 700 (e.g., in electronic devices operated by users or the system where the software 728 represents the software to implement tenant components that are downstream from the flow control mechanism or that are monitored by the activity tracker (e.g., a web browser, a native client, a portal, a command-line interface, and/or an application program interface (API) based upon protocols such as Simple Object Access Protocol (SOAP), Representational State Transfer (REST), etc.)); 2) flow control mechanism is implemented in a separate set of one or more of the electronic devices 700 (e.g., a set of one or more server electronic devices where the software 728 represents the software to implement the flow control mechanism); and 3) in operation, the electronic devices implementing the flow control mechanism and other architectural components would be communicatively coupled (e.g., by a network) and would establish between them (or through one or more other layers) connections for streaming metrics and events. Other configurations of electronic devices may be used in other implementations (e.g., an implementation in which the architectural components and/or the flow control mechanism are implemented on a single electronic device 700).

In electronic devices that use compute virtualization, the set of one or more processor(s) 722 typically execute software to instantiate a virtualization layer 708 and software container(s) 704A-R (e.g., with operating system-level virtualization, the virtualization layer 708 represents the kernel of an operating system (or a shim executing on a base operating system) that allows for the creation of multiple software containers 704A-R (representing separate user space instances and also called virtualization engines, virtual private servers, or jails) that may each be used to execute a set of one or more applications; with full virtualization, the virtualization layer 708 represents a hypervisor (sometimes referred to as a virtual machine monitor (VMM)) or a hypervisor executing on top of a host operating system, and the software containers 704A-R each represent a tightly isolated form of a software container called a virtual machine that is run by the hypervisor and may include a guest operating system; with para-virtualization, an operating system or application running with a virtual machine may be aware of the presence of virtualization for optimization purposes). Again, in electronic devices where compute virtualization is used, during operation an instance of the software 728 (illustrated as instance 706A) is executed within the software container 704A on the virtualization layer 708. In electronic devices where compute virtualization is not used, the instance 706A on top of a host operating system is executed on the "bare metal" electronic device 700. The instantiation of the instance 706A, as well as the virtualization layer 708 and software containers 704A-R if implemented, are collectively referred to as software instance(s) 702.

Alternative implementations of an electronic device may have numerous variations from that described above. For example, customized hardware and/or accelerators might also be used in an electronic device.

Network Device

A network device (ND) is an electronic device that communicatively interconnects other electronic devices on the network (e.g., other network devices, user electronic devices, server electronic devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video).

Exemplary Environment

Figure 7B:
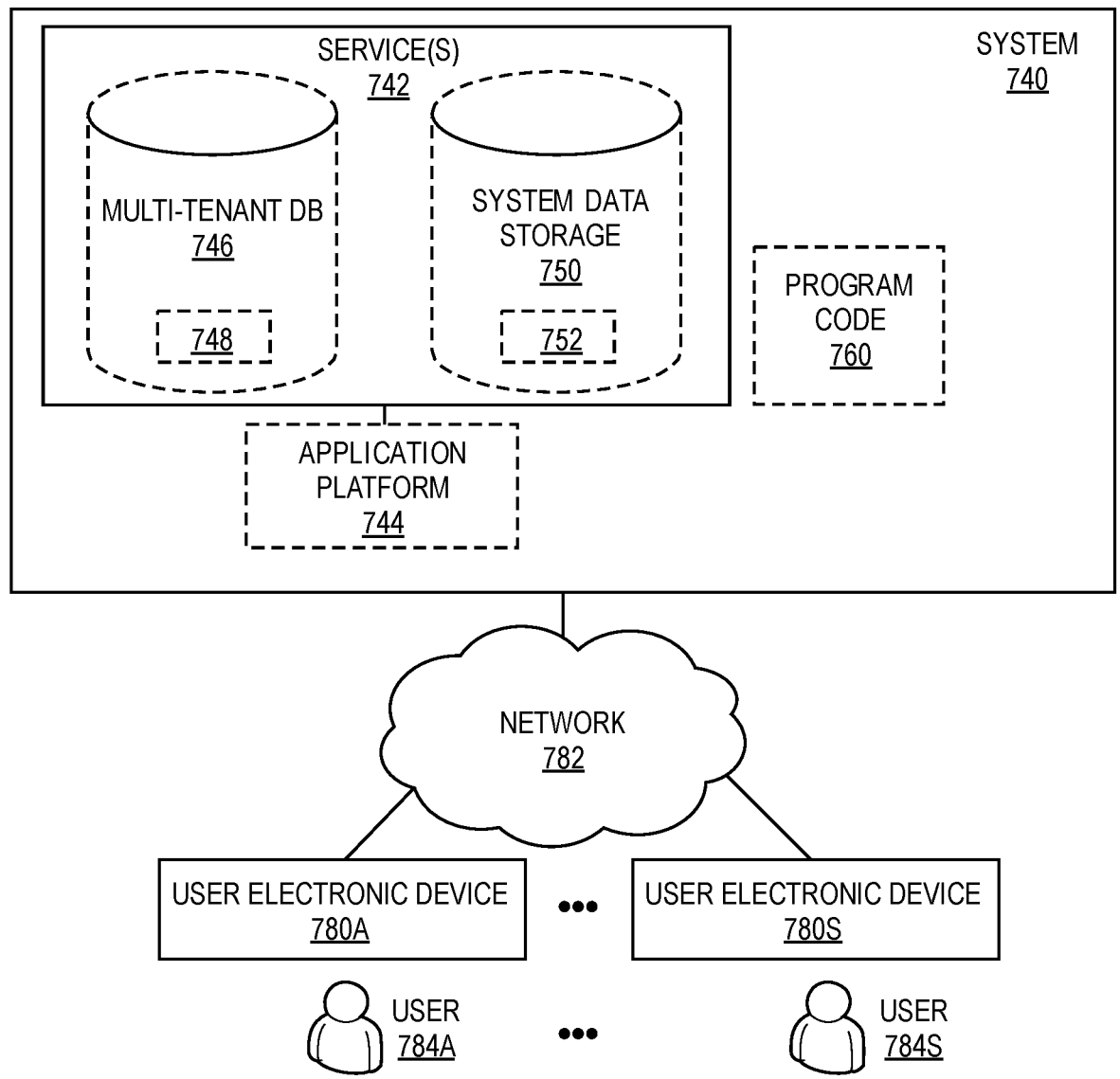
FIG. 7B is a block diagram of an environment where a flow control mechanism may be deployed, according to some implementations.

FIG. 7B is a block diagram of an environment where a flow control mechanism may be deployed, according to some implementations. A system 740 includes hardware (a set of one or more electronic devices) and software to provide service(s) 742, including the flow control mechanism. The system 740 is coupled to user electronic devices 780A-S over a network 782. The service(s) 742 may be on-demand services that are made available to one or more of the users 784A-S working for one or more other organizations (sometimes referred to as outside users) so that those organizations do not need to necessarily be concerned with building and/or maintaining a system, but instead makes use of the service(s) 742 when needed (e.g., on the demand of the users 784A-S). The service(s) 742 may communication with each other and/or with one or more of the user electronic devices 780A-S via one or more Application Programming Interface(s) (APIs) (e.g., a Representational State Transfer (REST) API). The user electronic devices 780A-S are operated by users 784A-S.

In one implementation, the system 740 is a multi-tenant cloud computing architecture supporting multiple services where the flow control mechanism and other example architectural components or similar components, such as a customer relationship management (CRM) service (e.g., Sales Cloud by salesforce.com, Inc.), a contracts/proposals/quotes service (e.g., Salesforce CPQ by salesforce.com, Inc.), a customer support service (e.g., Service Cloud and Field Service Lightning by salesforce.com, Inc.), a marketing service (e.g., Marketing Cloud, Salesforce DMP, and Pardot by salesforce.com, Inc.), a commerce service (e.g., Commerce Cloud Digital, Commerce Cloud Order Management, and Commerce Cloud Store by salesforce.com, Inc.), communication with external business data sources (e.g., Salesforce Connect by salesforce.com, Inc.), a productivity service (e.g., Quip by salesforce.com, Inc.), database as a service (e.g., Database.com™ by salesforce.com, Inc.), Data as a Service (DAAS) (e.g., Data.com by salesforce.com, Inc.), Platform as a Service (PAAS) (e.g., execution runtime and application (app) development tools; such as, Heroku™ Enterprise, Thunder, and Force.com® and Lightning by salesforce.com, Inc.), an analytics service (e.g., Einstein Analytics, Sales Analytics, and/or Service Analytics by salesforce.com, Inc.), a community service (e.g., Community Cloud and Chatter by salesforce.com, Inc.), an Internet of Things (IoT) service (e.g., Salesforce IoT and IoT Cloud by salesforce.com, Inc.), industry specific services (e.g., Financial Services Cloud and Health Cloud by salesforce.com, Inc.), and/or Infrastructure as a Service (IAAS) (e.g., virtual machines, servers, and/or storage). For example, system 740 may include an application platform 744 that enables PAAS for creating, managing, and executing one or more applications developed by the provider of the application platform 744, users accessing the system 740 via one or more of user electronic devices 780A-S, or third-party application developers accessing the system 740 via one or more of user electronic devices 780A-S.

In some implementations, one or more of the service(s) 742 may utilize one or more multi-tenant databases 746 for tenant data 748, as well as system data storage 750 for system data 752 accessible to system 740. In certain implementations, the system 740 includes a set of one or more servers that are running on server electronic devices and that are configured to handle requests for any authorized user associated with any tenant (there is no server affinity for a user and/or tenant to a specific server). The user electronic device 780A-S communicate with the server(s) of system 740 to request and update tenant-level data and system-level data hosted by system 740, and in response the system 740 (e.g., one or more servers in system 740) automatically may generate one or more Structured Query Language (SQL) statements (e.g., one or more SQL queries) that are designed to access the desired information from the one or more multi-tenant database 746 and/or system data storage 750.

In some implementations, the service(s) 742 are implemented using virtual applications dynamically created at run time responsive to queries from the user electronic devices 780A-S and in accordance with metadata, including: 1) metadata that describes constructs (e.g., forms, reports, workflows, user access privileges, business logic) that are common to multiple tenants; and/or 2) metadata that is tenant specific and describes tenant specific constructs (e.g., tables, reports, dashboards, interfaces, etc.) and is stored in a multi-tenant database. To that end, the program code 760 may be a runtime engine that materializes application data from the metadata; that is, there is a clear separation of the compiled runtime engine (also known as the system kernel), tenant data, and the metadata, which makes it possible to independently update the system kernel and tenant-specific applications and schemas, with virtually no risk of one affecting the others. Further, in one implementation, the application platform 744 includes an application setup mechanism that supports application developers' creation and management of applications, which may be saved as metadata by save routines. Invocations to such applications, including the flow control mechanism, may be coded using Procedural Language/Structured Object Query Language (PL/SOQL) that provides a programming language style interface. A detailed description of some PL/SOQL language implementations is discussed in U.S. Pat. No. 7,730,478 entitled, METHOD AND SYSTEM FOR ALLOWING ACCESS TO DEVELOPED APPLICATIONS VIA A MULTI-TENANT ON-DEMAND DATABASE SERVICE, by Craig Weissman, filed Sep. 21, 2007. Invocations to applications may be detected by one or more system processes, which manages retrieving application metadata for the tenant making the invocation and executing the metadata as an application in a software container (e.g., a virtual machine).

Network 782 may be any one or any combination of a LAN (local area network), WAN (wide area network), telephone network, wireless network, point-to-point network, star network, token ring network, hub network, or other appropriate configuration. The network may comply with one or more network protocols, including an Institute of Electrical and Electronics Engineers (IEEE) protocol, a 3rd Generation Partnership Project (3GPP) protocol, or similar wired and/or wireless protocols, and may include one or more intermediary devices for routing data between the system 740 and the user electronic devices 780A-S.

Each user electronic device 780A-S (such as a desktop personal computer, workstation, laptop, Personal Digital Assistant (PDA), smart phone, etc.) typically includes one or more user interface devices, such as a keyboard, a mouse, a trackball, a touch pad, a touch screen, a pen or the like, for interacting with a graphical user interface (GUI) provided on a display (e.g., a monitor screen, a liquid crystal display (LCD), etc.) in conjunction with pages, forms, applications and other information provided by system 740. For example, the user interface device can be used to access data and applications hosted by system 740, and to perform searches on stored data, and otherwise allow a user 784 to interact with various GUI pages that may be presented to a user 784. User electronic devices 780A-S might communicate with system 740 using TCP/IP (Transfer Control Protocol and Internet Protocol) and, at a higher network level, use other networking protocols to communicate, such as Hypertext Transfer Protocol (HTTP), FTP, Andrew File System (AFS), Wireless Application Protocol (WAP), File Transfer Protocol (FTP), Network File System (NFS), an application program interface (API) based upon protocols such as Simple Object Access Protocol (SOAP), Representational State Transfer (REST), etc. In an example where HTTP is used, one or more user electronic devices 780A-S might include an HTTP client, commonly referred to as a "browser," for sending and receiving HTTP messages to and from server(s) of system 740, thus allowing users 784 of the user electronic device 780A-S to access, process and view information, pages and applications available to it from system 740 over network 782.

Conclusion

In the above description, numerous specific details such as resource partitioning/sharing/duplication implementations, types and interrelationships of system components, and logic partitioning/integration choices are set forth in order to provide a more thorough understanding. It will be appreciated, however, by one skilled in the art, that the invention may be practiced without such specific details. In other instances, control structures, logic implementations, opcodes, means to specify operands, and full software instruction sequences have not been shown in detail since those of ordinary skill in the art, with the included descriptions, will be able to implement what is described without undue experimentation.

References in the specification to "one implementation," "an implementation," "an example implementation," etc., indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, or characteristic is described in connection with an implementation, it is submitted that it is within the knowledge of one skilled in the art to affect such feature, structure, or characteristic in connection with other implementations whether or not explicitly described.

Bracketed text and blocks with dashed borders (e.g., large dashes, small dashes, dot-dash, and dots) may be used herein to illustrate optional operations and/or structures that add additional features to some implementations. However, such notation should not be taken to mean that these are the only options or optional operations, and/or that blocks with solid borders are not optional in certain implementations.

In the following description and claims, the term "coupled," along with its derivatives, may be used. "Coupled" is used to indicate that two or more elements, which may or may not be in direct physical or electrical contact with each other, co-operate or interact with each other.

The operations in the flow diagrams are be described with reference to the exemplary implementations in the other figures. However, the operations of the flow diagrams can be performed by implementations other than those discussed with reference to the other figures, and the implementations discussed with reference to these other figures can perform operations different than those discussed with reference to the flow diagrams.

While the flow diagrams in the figures show a particular order of operations performed by certain implementations, it should be understood that such order is exemplary (e.g., alternative implementations may perform the operations in a different order, combine certain operations, overlap certain operations, etc.).

While the above description includes several exemplary implementations, those skilled in the art will recognize that the invention is not limited to the implementations described and can be practiced with modification and alteration within the spirit and scope of the appended claims. The description is thus illustrative instead of limiting.

What is claimed is:

1. A method of managing synchronization of data streams in a multi-tenant system, the method comprising:

tracking, using a stream history of a flow control mechanism a recent flow rate of at least one data stream of a plurality of data streams received from respective tenants of the multi-tenant system, the stream history storing a plurality of flow messages received on a common flow control channel that is common to the respective tenants, the plurality of flow messages comprising one or more flow messages associated with the at least one data stream;

identifying at least one related data stream of the plurality of data streams using configuration information or metadata stored within the stream history;

determining by the flow control mechanism whether the recent flow rate of the at least one data stream varies from the at least one related data stream; and transmitting by the flow control mechanism a flow message to a flow controller via the common flow control channel to adjust a throughput of the at least one data stream at the flow controller to match with the at least one related data stream, in response to determining by the flow control mechanism that the at least one data stream has varied from the at least one related data stream, where the flow controller is upstream of the flow control mechanism in the at least one data stream within the multi-tenant system.

2. The method of managing synchronization of data streams of claim 1, further comprising:
computing a current flow rate by a flow rate computation unit of a flow coordinator for the at least one data stream.

3. The method of managing synchronization of data streams of claim 1, further comprising:
comparing a current flow rate of the at least one data stream by a flow rate examiner in a flow coordinator with a flow rate history to identify variation in recent flow rate for the at least one data stream.

4. The method of managing synchronization of data streams of claim 1, wherein a flow coordinator of the flow control mechanism sends the flow message on the common flow control channel where the flow message indicates a change in flow rate for the at least one data stream, in response to determining a variance in the flow rate of the at least one data stream.

5. The method of managing synchronization of data streams of claim 1, further comprising:
determining by a stream flow adjustment computation unit of a stream flow controller whether to adjust a flow rate of the at least one data stream based on the stream history of related data streams.

6. The method of managing synchronization of data streams of claim 1, further comprising:
sending by a stream flow controller a flow control message to a flow controller to adjust a flow rate of the at least one data stream.

7. A non-transitory machine-readable storage medium that provides instructions that, if executed by a processor, will cause said processor to perform operations comprising:
tracking, using a stream history of a flow control mechanism a recent flow rate of at least one data stream of a plurality of data streams received from respective tenants of a multi-tenant system, the stream history storing a plurality of glow messages received on a common flow control channel that is common to the respective tenants, the plurality of flow messages comprising one or more flow messages associated with the at least one data stream;
identifying at least one related data stream of the plurality of data streams using configuration information or metadata stored within the stream history;
determining by the flow control mechanism whether the recent flow rate of the at least one data stream varies from the at least one related data stream; and
transmitting by the flow control mechanism a flow message to a flow controller via the common flow control channel to adjust a throughput of the at least one data stream at the flow controller to match with the at least one related data stream, in response to determining by the flow control mechanism that the at least one data stream has varied from the at least one related data stream, where the flow controller is upstream of the flow control mechanism in the at least one data stream within the multi-tenant system.

8. The non-transitory machine-readable storage medium of claim 7, the operations further comprising:
computing a current flow rate by a flow rate computation unit of a flow coordinator for the at least one data stream.

9. The non-transitory machine-readable storage medium of claim 7, the operations further comprising:
comparing a current flow rate of the at least one data stream by a flow rate examiner in a flow coordinator with a flow rate history to identify variation in recent flow rate for the at least one data stream.

10. The non-transitory machine-readable storage medium of claim 7, wherein
a flow coordinator of the flow control mechanism sends the flow message on the common flow control channel where the flow message indicates a change in flow rate for the at least one data stream, in response to determining a variance in the flow rate of the at least one data stream.

11. The non-transitory machine-readable storage medium of claim 7, the operations further comprising:
determining by a stream flow adjustment computation unit of a stream flow controller whether to adjust a flow rate of the at least one data stream based on the stream history of related data streams.

12. The non-transitory machine-readable storage medium of claim 7, the operations further comprising:
sending by a stream flow controller a flow control message to a flow controller to adjust a flow rate of the at least one data stream.

13. A computing device in a multi-tenant environment, the computing device comprising:
a non-transitory machine-readable medium having stored therein a stream processor and a flow control mechanism; and
a processor coupled to the non-transitory machine-readable medium, the processor to execute the stream processor and the flow control mechanism, the flow control mechanism to:
track, using a stream history of a flow control mechanism, a recent flow rate of at least one data stream of a plurality of data streams received from respective tenants of the multi-tenant system, the stream history storing a plurality of one or more flow messages received on a common flow control channel that is common to the respective tenants, the plurality of flow messages comprising one or more flow messages associated with the at least one data stream;
identify at least one related data stream of the plurality of data streams using configuration information or metadata stored within the stream history;
determine by the flow control mechanism whether the recent flow rate of the at least one data stream varies from the at least one related data stream; and
transmit by the flow control mechanism a flow message to a flow controller via the common flow control channel to adjust a throughput of the at least one data stream at the flow controller to match with the at least one related data stream, in response to determining by the flow control mechanism that the at least one data stream has varied from the at least one related data stream, where the flow controller is upstream of the flow control mechanism in the at least one data stream within the multi-tenant system.

14. The computing device of claim 13, wherein the flow control mechanism is further to compute a current flow rate by a flow rate computation unit of a flow coordinator for the at least one data stream.

15. The computing device of claim 13, wherein the flow control mechanism is further to compare a current flow rate of the at least one data stream by a flow rate examiner in a flow coordinator with a flow rate history to identify variation in recent flow rate for the at least one data stream.

16. The computing device of claim 13, wherein a flow coordinator of the flow control mechanism sends the flow message on the common flow control channel where the flow message indicates a change in flow rate for the at least one data stream, in response to determining a variance in the flow rate of the at least one data stream.

17. The computing device of claim 13, wherein the flow control mechanism is further to determine by a stream flow adjustment computation unit of a stream flow controller whether to adjust a flow rate of the at least one data stream based on the stream history of related data streams.

18. The computing device of claim 13, wherein the flow control mechanism is further to send by the stream flow controller a flow control message to a flow controller to adjust a flow rate of the at least one data stream.

\* \* \* \* \*